United States Patent [19]

Wise et al.

[11] Patent Number: 4,514,103
[45] Date of Patent: Apr. 30, 1985

[54] SAFETY GUIDES FOR USE WITH A ROTARY HOSE AND KELLY SPINNER HOSES AND THE COMBINATION THEREOF

[75] Inventors: Thomas J. Wise; John N. Garratt, both of Houston, Tex.

[73] Assignee: Goodall Rubber Company, Trenton, N.J.

[21] Appl. No.: 402,761

[22] Filed: Jul. 28, 1982

[51] Int. Cl.³ .............................................. F16L 3/22
[52] U.S. Cl. .................................. 138/106; 138/103; 138/111; 138/178; 175/216; 248/74.1
[58] Field of Search ............... 138/103, 106, 107, 111, 138/112, 178; 175/216, 207; 173/57, 157, 159; 248/74 R, 74 B, 75, 49, 74.1, 68 R, 69; 137/355.17; 285/188

[56] References Cited

U.S. PATENT DOCUMENTS

| B 390,679 | 1/1925 | Todd et al. | 285/137 R X |
|---|---|---|---|
| 1,545,295 | 7/1925 | Wilford | 138/106 X |
| 1,591,028 | 7/1926 | Farrar | 138/106 X |
| 1,740,701 | 12/1929 | Osgood | 173/159 |
| 1,824,459 | 9/1931 | Beckwith | 248/74.1 |
| 2,175,662 | 10/1939 | Guarnaschelli | 138/106 X |
| 2,845,251 | 7/1958 | Barton et al. | 173/159 X |
| 3,082,844 | 3/1963 | MacDonald | 138/111 X |
| 3,526,934 | 9/1970 | Owen | 138/106 X |

Primary Examiner—James E. Bryant, III
Attorney, Agent, or Firm—John F. A. Earley; John F. A. Earley, III

[57] ABSTRACT

A safety guide for kelly spinner hoses in drilling rigs and a plurality of said safety guides in combination with kelly hoses and a rotary hose. Each safety guide comprises a pair of opposed rings, each adapted to receive and guide a kelly spinner hose, and a device for securing the rings to a rotary hose substantially in a plane perpendicular to the axis of the rotary hose. Advantageously, each ring has a rigid integral loop member and the securing device comprises a flexible band passing through said loop members. It is preferred to secure the band to the rotary hose with a buckle. In the combination, a plurality of the safety guides are spaced along the length of the rotary hose, preferably substantially equidistant.

7 Claims, 5 Drawing Figures

SAFETY GUIDES FOR USE WITH A ROTARY HOSE AND KELLY SPINNER HOSES AND THE COMBINATION THEREOF

TECHNICAL FIELD

This invention is in the field of oil drilling equipment.

BACKGROUND OF THE PRIOR ART

In an effort to prevent kinking, binding or snagging of kelly spinner hoses during the raising and lowering of said hoses together with a rotary hose in oil drilling rigs, it is known to tape the kelly spinner hoses to the rotary hose which provides the drilling fluid. There is a serious defect in this arrangement since the kelly spinner hoses and the rotary hose are used independently in the sense that they are under different pressures at different times. Thus, for example, the kelly spinner hoses will not be pressurized with air when the rotary hose is pressurized with the drilling fluid. Since the pressurization of the rotary hose is typically in the range of from four thousand to five thousand psi, the hose is substantially elongated typically from about six to ten inches. This results in substantial straining of the kelly hoses. By the same token the kelly hoses when they are pressurized, are strained due to the fact they are prevented from moving relative to the rotary hose. Further, these strains have a tendency to rupture the tape leaving the kelly spinner hoses free to move independently which is a serious hazard for rig personnel since, if one of these hoses ruptures or separates from the fittings attached to the kelly swivel it will whip violently incident to the exhausting of the high pressure air through the rupture or the freed end of the hose. All of these problems have been solved by this invention by providing guides for the kelly hoses which attach to the rotary hose and permit the kelly hose and the rotary hose to move freely axially relative to each other while preventing kinking, binding and snagging while the hoses are raised and lowered. In addition, the invention facilitates the installing and disconnecting the kelly spinner hoses. The life expectancy of the kelly spinner hoses is increased, reducing down time.

BRIEF SUMMARY OF THE INVENTION

The invention is a safety guide for kelly spinner hoses in drilling rigs and a plurality of said safety guides in combination with kelly hoses and a rotary hose. Each safety guide comprises a pair of opposed rings, each adapted to receive and guide a kelly spinner hose, and a device for securing the rings to a rotary hose substantially in a plane perpendicular to the axis of the rotary hose. Advantageously, each ring has a rigid integral loop member and the securing device comprises a flexible band passing through said loop members. It is preferred to secure the band to the rotary hose with a buckle. In the combination, a plurality of the safety guides are spaced along the length of the rotary hose, preferably substantially equidistant.

DETAILED DESCRIPTION

Figure 1:
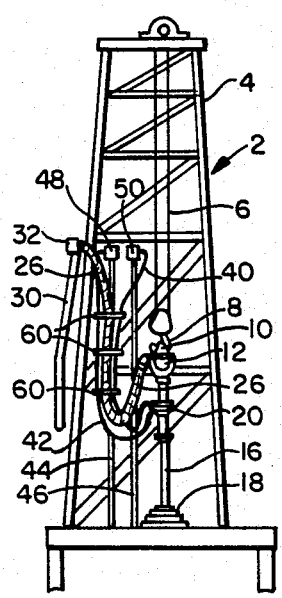
FIG. 1 is an elevational view partially broken away of an oil drilling rig.
Figure 2:
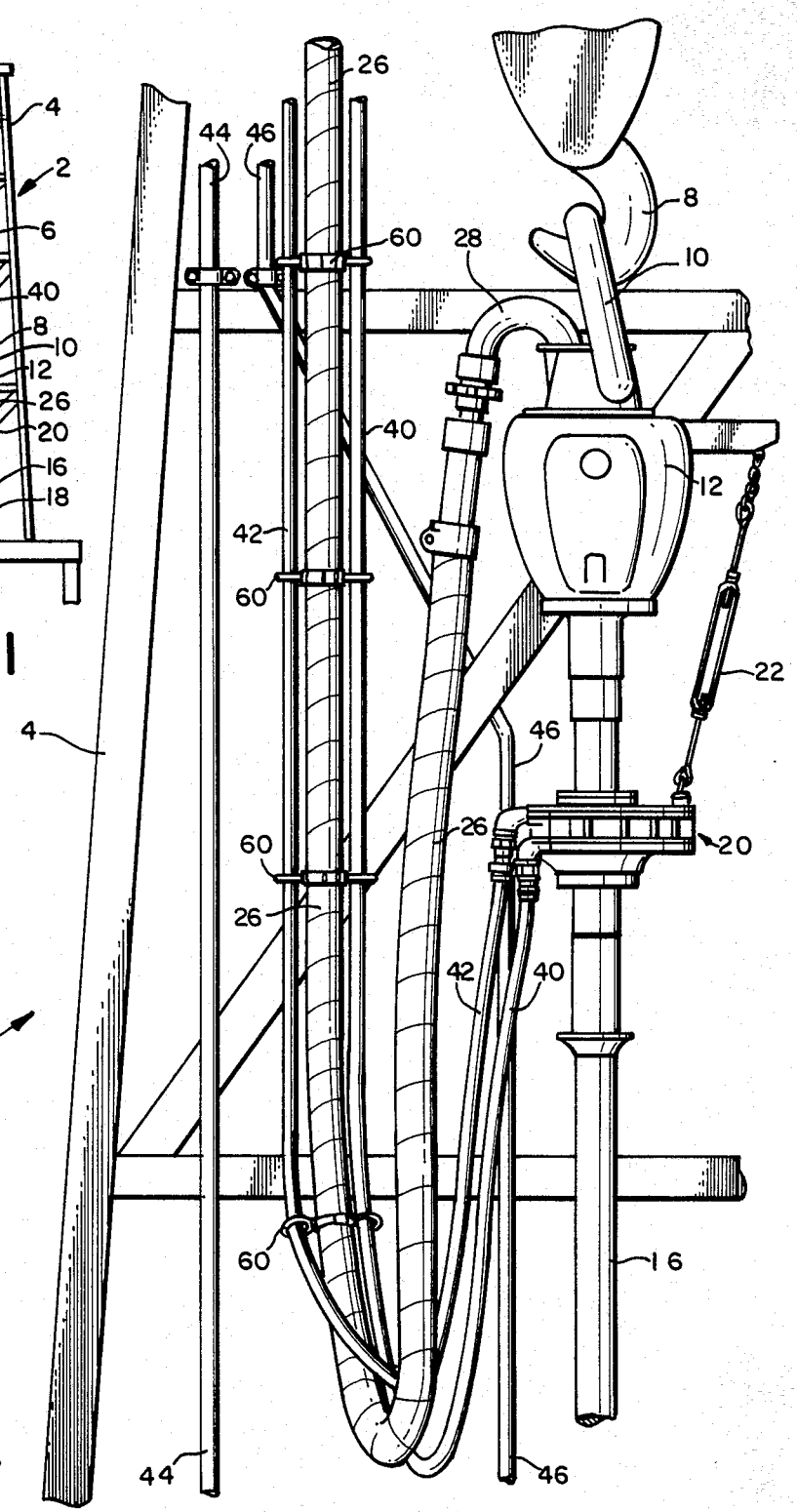
FIG. 2 is an enlarged elevational view, partially broken away.

Referring to FIG. 1, an oil drilling rig 2 has a derrick 4 having a hoist 6 provided with a lifting hook 8 which is adapted to engage a ring 10 (FIG. 2) attached to a swivel fitting 12 which in turn is connected to a kelly indicated at 16 adapted to connect with a rotary table 18 (FIG. 1). A kelly spinner 20 rotates kelly 16 and is supported by a turn buckle 22 connected to swivel fitting 12.

A rotary hose 26 is connected by a fitting indicated at 28 (FIG. 2) to swivel fitting 12. Rotary hose 26 is connected to a stand pipe 30 which is adapted to deliver a drilling fluid as indicated at 32 (FIG. 1). Kelly spinner hoses 40 and 42 are connected to Kelly spinner 20 and are respectively connected to their delivery pipes 44 and 46 as indicated at 48 and 50 (separated for clarity in FIG. 1, but actually close to fitting 32).

The structure thus described is well known to the prior art and hence need not be described in greater detail.

Kelly spinner hoses 40 and 42 are each guided by a plurality of guides 60 in accordance with the invention which are substantially equally spaced along the length of rotary hose 26.

Figure 3:
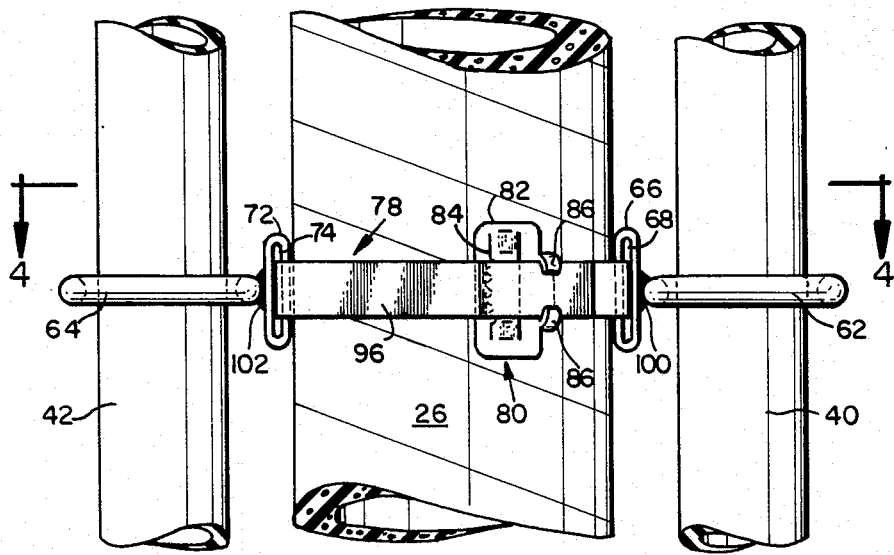
FIG. 3 is an elevational view showing a guide in accordance with the invention in association with the kelly spinner hoses and the rotary hose of the rig of FIG. 1.
Figure 4:
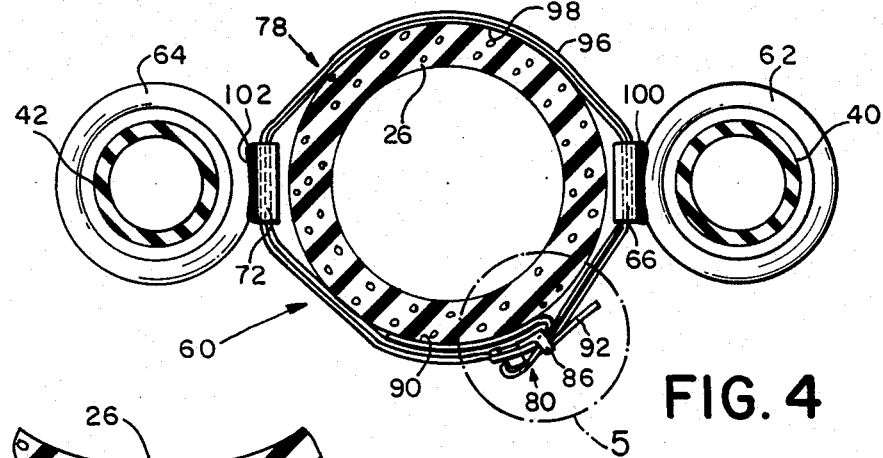
FIG. 4 is a horizontal sectional view taken on the plane indicated by the line 4—4 of FIG. 3.

As best seen in FIG. 4, each guide 60 has a pair of opposed guide rings 62 and 64 through which hoses 40 and 42 pass respectively. Guide ring 62 has an integral member loop member 66 which runs substantially perpendicular to a plane through ring 62 and has a relatively narrow opening 68 (FIG. 3). Likewise, guide ring 64 has an integral loop member 72 running substantially perpendicular to the plane of ring 64 and having a relatively narrow opening 74.

Figure 5:
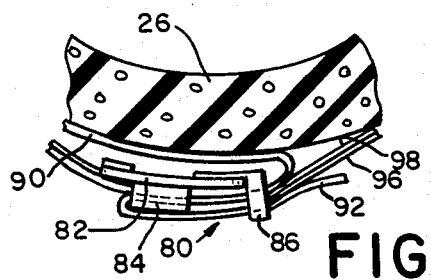
FIG. 5 is an enlarged view of the buckle shown in FIG. 4.

A band 78 passes through openings 68 and 74 and around rotary hose 26 to which it is tightly secured by buckle 80. Buckle 80 has a flat plate 82 to which is secured a loop 84 (FIG. 5) and outwardly and downwardly extending opposed fingers 86, 86. The inner end 90 of band 78 passes between plate 82 and loop 84 and between back plate 82 and fingers 86, 86 and is bent back on itself inside of plate 82. Band 78 is then run around rotary hose 26 twice passing through loop members 66 and 72 and between plate 82 and both loop 84 and fingers 86 twice to form two loops indicated at 96 and 98 in FIG. 4 and then outer end 92 is turned back on itself over loop 84 and passed inside of fingers 86, 86 thus securing the rings 62 and 64 to rotary hose 26 (FIGS. 4 and 5).

The guides 60 are substantially equally spaced along hose 26 advantageously at a distance of from about 96 to about 144 inches. It will be seen that since the kelly spinner hoses 40 and 42 are loosely received in guide rings 62 and 64 each of the hoses 40, 42 and 26 can move freely axially relative to each other. Should one of the hoses 40 or 42 become detached from the kelly spinner it will be prevented from dangerous whipping. While a variety of materials may be used to make the guides 60, it is preferred to employ stainless steel for all the parts. The guide rings 62 and 64 are conveniently welded to loop members 66 and 72 as indicated at 100 and 102 respectively in FIGS. 3 and 4.

It will be understood that the above-described embodiment is illustrative and is not intended to be limiting.

We claim:

1. A safety guide for kelly spinner hoses comprising:
a pair of opposed separate guide rings each adapted to loosely receive and guide a kelly spinner hose when it is attached at one end to a spinner, and
means for fixedly securing said rings to a rotary hose substantially in a plane perpendicular to the axis of the rotary hose so that the spinner hoses are positioned substantially parallel to the rotary hose and are adapted to slide and turn in the guides in response to wind and pressure and movement of the spinner hoses when they are being raised and lowered.

2. A guide in accordance with claim 1 in which the securing means comprises a loop member integral with each ring and a flexible band passing through said loop members and having means for securing the band to the rotary hose.

3. A guide in accordance with claim 2 in which the means for securing the band to the rotary hose is a buckle.

4. In combination with a rotary hose and kelly spinner hoses the improvement comprising:
a plurality of separate spaced safety guides each comprising a pair of opposed guide rings each loosely receiving and guiding a kelly hose, and
means for fixedly securing each guide to the rotary hose substantially in a plane perpendicular to the axis of the rotary hose.

5. The combination of claim 4 in which the securing means comprises a loop member fixedly secured to each ring and a flexible band passing through the loop members and the band has means for securing the band to the rotary hose.

6. The combination of claim 5 in which the means for securing each band to the rotary hose is a buckle.

7. The combination of claims 4 or 5 or 6 in which the guides are spaced substantially equally along the length of the rotary hose.

* * * * *